United States Patent
Wang et al.

(10) Patent No.: US 9,140,596 B2
(45) Date of Patent: Sep. 22, 2015

(54) METHOD AND DEVICE FOR DETECTING ABNORMAL STATE OF MEDICAL CONTAINER

(71) Applicants: CHIMEI MEDICAL CENTER, Tainan (TW); ASTEK TECHNOLOGY LTD., Tainan (TW)

(72) Inventors: Jhi-Joung Wang, Tainan (TW); Willy Chou, Tainan (TW); Hsiu-Nien Shen, Tainan (TW); Bor-Shyh Lin, Tainan (TW); Jiun-Hung Lin, Tainan (TW); Chun-Hao Lu, Tainan (TW); Cheng-Chi Tai, Tainan (TW)

(73) Assignees: Chimei Medical Center, Tainan (TW); Astek Technology Ltd., Tainan (TW)

( * ) Notice: Subject to any disclaimer, the term of this patent is extended or adjusted under 35 U.S.C. 154(b) by 13 days.

(21) Appl. No.: 14/182,402

(22) Filed: Feb. 18, 2014

(65) Prior Publication Data

US 2015/0233749 A1    Aug. 20, 2015

(51) Int. Cl.
   G01F 23/20    (2006.01)
   G08B 21/18    (2006.01)
(52) U.S. Cl.
   CPC .............. G01F 23/20 (2013.01); G08B 21/182 (2013.01)
(58) Field of Classification Search
   CPC ..... G01F 23/205; G01F 23/20; G08B 21/182; A61M 5/14; A61M 5/16845; A61M 5/16895
   USPC ............. 604/509; 702/45; 340/573.1, 539.12, 340/613
   See application file for complete search history.

(56) References Cited

U.S. PATENT DOCUMENTS

| 4,889,528 | A  | * | 12/1989 | Nadai et al. | 604/65 |
| 5,112,319 | A  | * | 5/1992 | Lai | 604/246 |
| 2003/0048185 | A1 | * | 3/2003 | Citrenbaum et al. | 340/540 |
| 2008/0027409 | A1 | * | 1/2008 | Rudko et al. | 604/503 |
| 2011/0128152 | A1 | * | 6/2011 | Bregeon | 340/603 |
| 2014/0135732 | A1 | * | 5/2014 | Spronken et al. | 604/500 |
| 2015/0061876 | A1 | * | 3/2015 | Chang | 340/613 |

* cited by examiner

Primary Examiner — Daniel Wu
(74) Attorney, Agent, or Firm — Rosenberg, Klein & Lee

(57) ABSTRACT

A method for detecting abnormal state of medical container contains steps of: enabling a weight detecting unit to detect weight of a medical container which is coupled with a patient to acquire content change data; enabling an inclination detecting unit to detect inclination state of the medical container to acquire inclination data; receiving the content change data and the inclination data by a controlling unit; and comparing the content change data and the inclination data with preset content data and initial inclination data respectively, such that when the content change data is different from the preset content data, a warning unit is started by the controlling unit; or when the inclination data is different from the initial inclination data, the warning unit is started by the controlling unit. In addition, a device for detecting abnormal state of the medical container matches is used to execute above-mentioned steps.

8 Claims, 7 Drawing Sheets enabling a weight detecting unit to detect weight of a medical container which is coupled with a patient, to derive content change data from the detected weight of the medical container, and to store the content change data; meanwhile, enabling an inclination detecting unit to detect inclination state of the medical container, to derive inclination data from the detected inclination state, and to store the inclination data;

receiving the content change data and the inclination data by a controlling unit; and

comparing, by the controlling unit, the content change data and the inclination data with preset content data and initial inclination data, respectively, such that when the content change data is different from the preset content data, a warning unit is started by the controlling unit; or when the inclination data is different from the initial inclination data, the warning unit is started by the controlling unit.

FIG. 4

METHOD AND DEVICE FOR DETECTING ABNORMAL STATE OF MEDICAL CONTAINER

FIELD OF THE INVENTION

The present invention relates to a device and a method for detecting abnormal state of medical container, and more particularly to a device and a method which measure weight and inclination state of the medical container so as to notify medical personnel of patient's status immediately.

BACKGROUND OF THE INVENTION

Medical container, such as drip bottle or urine collection bag is replaced by medical personnel based on dose or flow speed of medicament in the drip bottle or according to urine amount in the urine collection bag.

However, such replacement manner will disturb patient or is troublesome for the medical personnel.

To improve this problem, TW Patent No. M446636, which is entitled "Warning Device for Measuring Urine Amount," has disclosed a measuring module for detecting and acquiring actual urine amount in the urine collection bag; a control module for setting expected urine amount so as to compare the actual urine amount with the expected urine amount; and a warning apparatus for outputting an alarm signal according to the comparison result; hence the actual urine amount is monitored automatically and accurately, enhancing the quality of medical care.

TW Patent No. M445446, which is entitled "Warning Device for Detecting Drip Flow," has disclosed a weight sensor for detecting weigh change of drip bottle or bag; and a processing unit for calculating flow speed based on the weight change within unit time, such that when the flow speed of medicament in the drip bottle is abnormal, the warning device reminds the medical personnel.

Nevertheless, such two conventional devices cannot notify the medical personnel of the abnormal state when the patient feels uncomfortable, such as turning body, trembling or falling off the bed.

The present invention has arisen to mitigate and/or obviate the afore-described disadvantages.

SUMMARY OF THE INVENTION

The primary object of the present invention is to provide a device and a method for detecting abnormal state of medical container in which the medical container (such as drip bottle or urine collection bag, etc.) is coupled with a patient so as to detect inclination state of the medical container when the patient turns or trembles on the bed to pull the medical container obliquely, thus notifying medical personnel to assist the patient.

To obtain the above objective, the present invention provides a method for detecting abnormal state of medical container, containing steps of: enabling a weight detecting unit to detect weight of a medical container which is coupled with a patient, to derive content change data from the detected weight of the medical container, and to store the content change data; enabling an inclination detecting unit to detect inclination state of the medical container, to derive inclination data from the detected inclination state, and to store the inclination data; receiving the content change data and the inclination data by a controlling unit; and comparing, by the controlling unit, the content change data and the inclination data with preset content data and initial inclination data, respectively, such that when the content change data is different from the preset content data, a warning unit is started by the controlling unit; or when the inclination data is different from the initial inclination data, the warning unit is started by the controlling unit.

Preferably, in the step of comparing, a warning signal is transmitted to a monitoring platform by a wireless transmission unit.

Preferably, the medical container is a drip bottle, the content change data is actual flow speed of medicament in the drip bottle, and the preset content data is expected flow speed of medicament in the drip bottle, and wherein in the step of comparing, the warning unit is started by the controlling unit when the actual flow speed does not match with the expected flow speed.

Preferably, the medical container is a urine collection bag, the content change data is actual urine volume in the urine collection bag, and the preset content data is estimated urine volume in the urine collection bag, and wherein in the step of comparing, the warning unit is started by the controlling unit when the actual urine volume exceeds the estimated urine volume.

The present invention also provides a device for detecting abnormal state of a medical container, containing: a controlling unit in which preset content data is stored; a weight detecting unit, coupled with the medical container and electrically connected with the controlling unit, for detecting a weight of the medical container so as to acquire content change data and to input the content change data into the controlling unit; an inclination detecting unit, electrically coupled with the controlling unit, for detecting inclination state of the medical container so as to acquire inclination data and to input the inclination data into the controlling unit; and a warning unit electrically coupled with the controlling unit. The content change data and the inclination data are respectively compared with the preset content data and initial inclination data by the controlling unit, and when the content change data is different from the preset content data, the warning unit is started by the controlling unit; or when the inclination data is different from the initial inclination data, the warning unit is started by the controlling unit.

Preferably, the controlling unit, the weight detecting unit, the inclination detecting unit and the warning unit are integrated on a housing, and the weight detecting unit has a first hook extending out of the housing.

Preferably, the housing has a second hook disposed thereon opposite to the first hook.

Preferably, the device further contains a wireless transmission unit electrically connected with the controlling unit.

Thereby, the method and the device of the present invention have following advantages:

1. The inclination state of the medical container (such as the urine collection bag or the drip bottle) and the amount of content in the medical container (such as urine in the urine collection bag or medicament in the medicament in the drip bottle) are detected such that the actual state of patient can be judged accordingly. If any abnormal state occurs, the warning unit is started to notify the medical personnel immediately, thus providing instant assistance to the patient.

2. The housing can be hanged on protruding portion of any object (such as a drip stand or support frame of a bed) by means of the second hook which is disposed on the housing.

BRIEF DESCRIPTION OF THE DRAWINGS

FIG. 4 is a flow chart of a method for detecting abnormal state of medical container according to a preferred embodiment of the present invention.

DETAILED DESCRIPTION OF THE PREFERRED EMBODIMENTS

Figure 1:
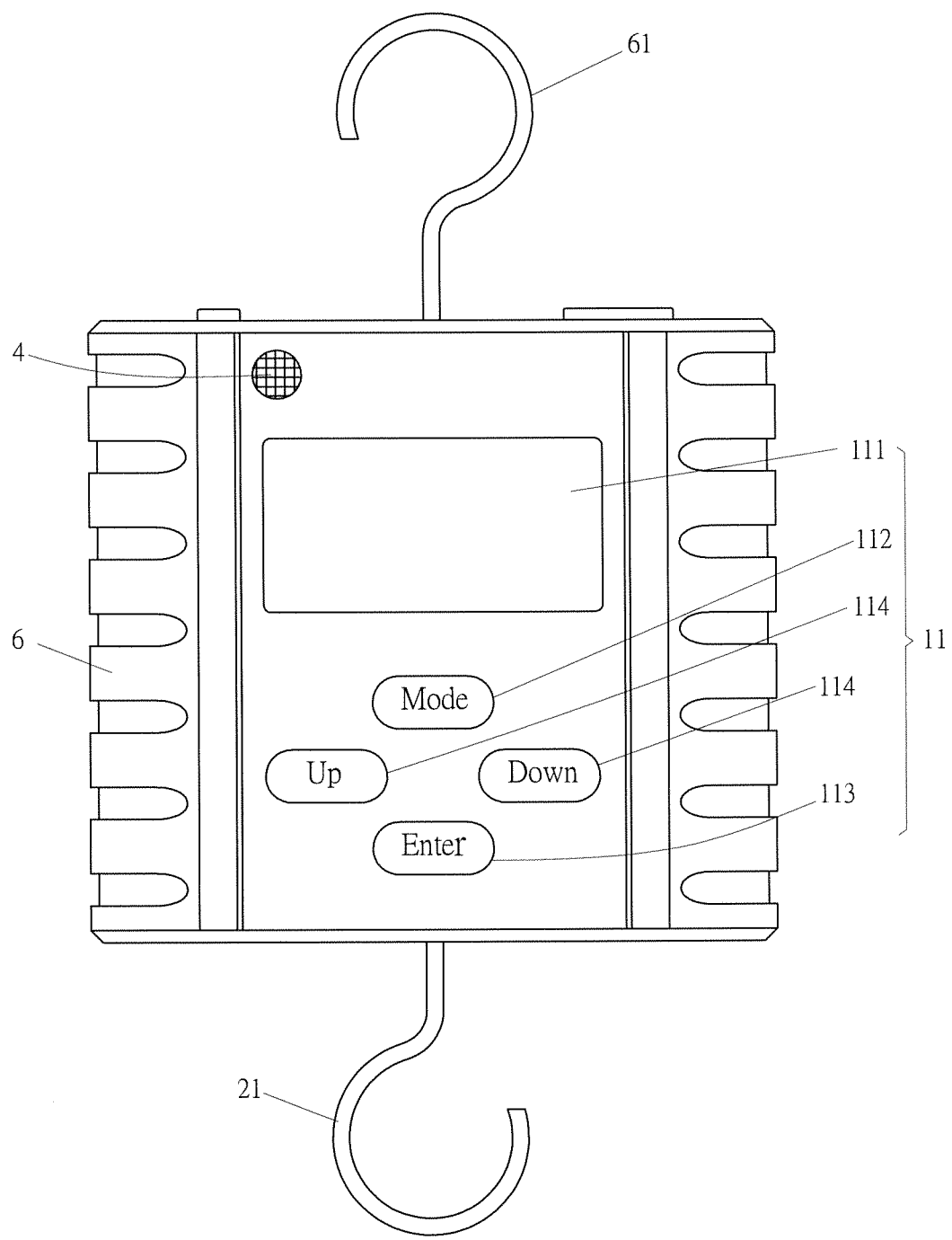
FIG. 1 is a plan view showing the assembly of a device for detecting abnormal state of medical container according to a preferred embodiment of the present invention.
Figure 2:
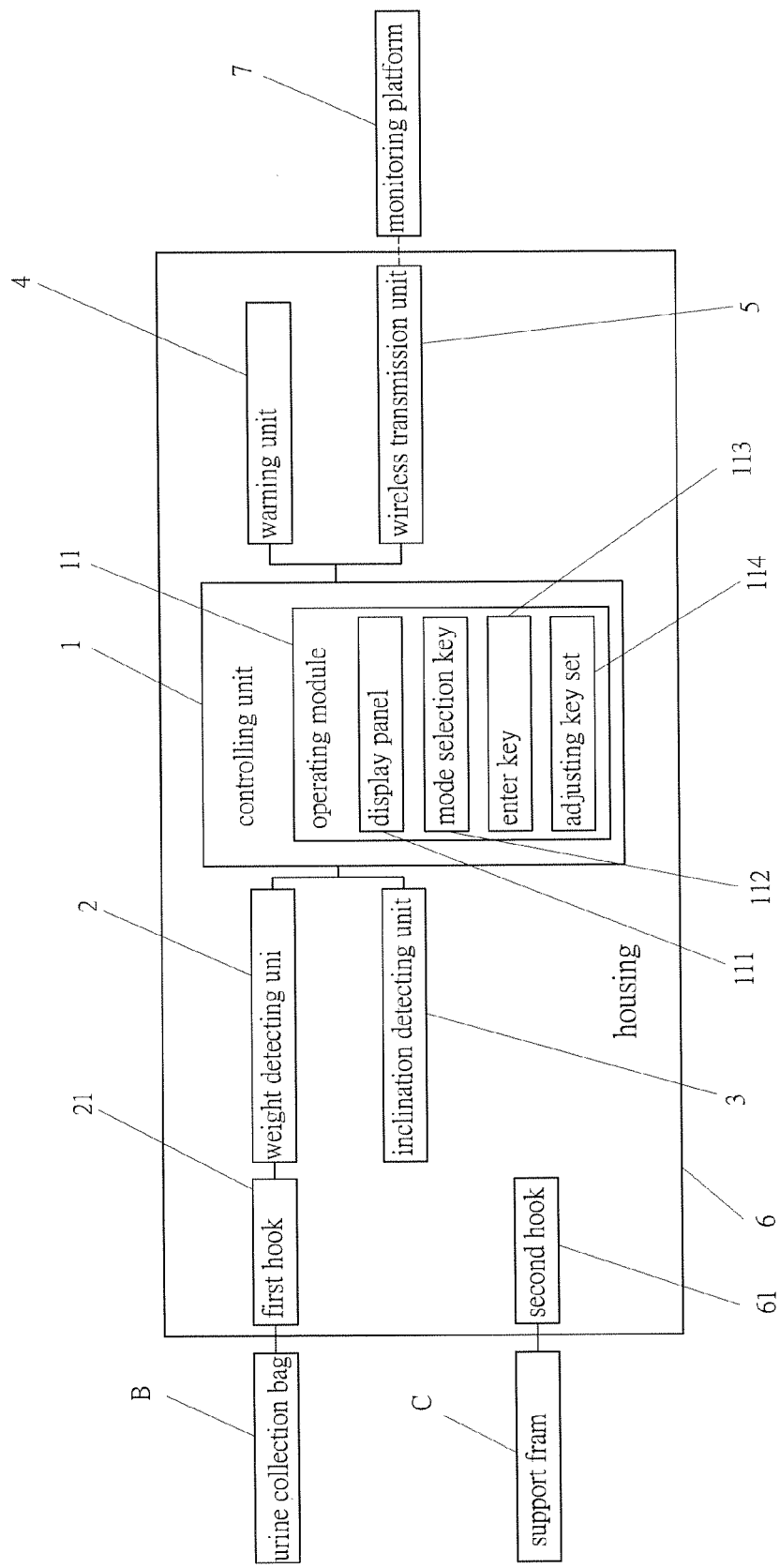
FIG. 2 is a block diagram showing the function of the device for detecting abnormal state of medical container according to the preferred embodiment of the present invention.

With reference to FIGS. 1 and 2, a device for detecting abnormal state of medical container according to a preferred embodiment of the present invention comprises a controlling unit 1, a weight detecting unit 2, an inclination detecting unit 3, a warning unit 4 and a wireless transmission unit 5, which are integrated on a housing 6. Moreover, the weight detecting unit 2, the inclination detecting unit 3, the warning unit 4, and the wireless transmission unit 5 are electrically connected with the controlling unit 1. The controlling unit 1 has an operating module 11. The operating module 11 comprises a display panel 111, a mode selection key 112, an enter key 113 and an adjusting key set 114, which are exposed outside the housing 6, wherein the adjusting key set 114 includes a plus key and a minus key. The weight detecting unit 2 has a first hook 21 extending out of the housing 6, and the housing 6 has a second hook 61 disposed thereon opposite to the first hook 21.

Figure 3:
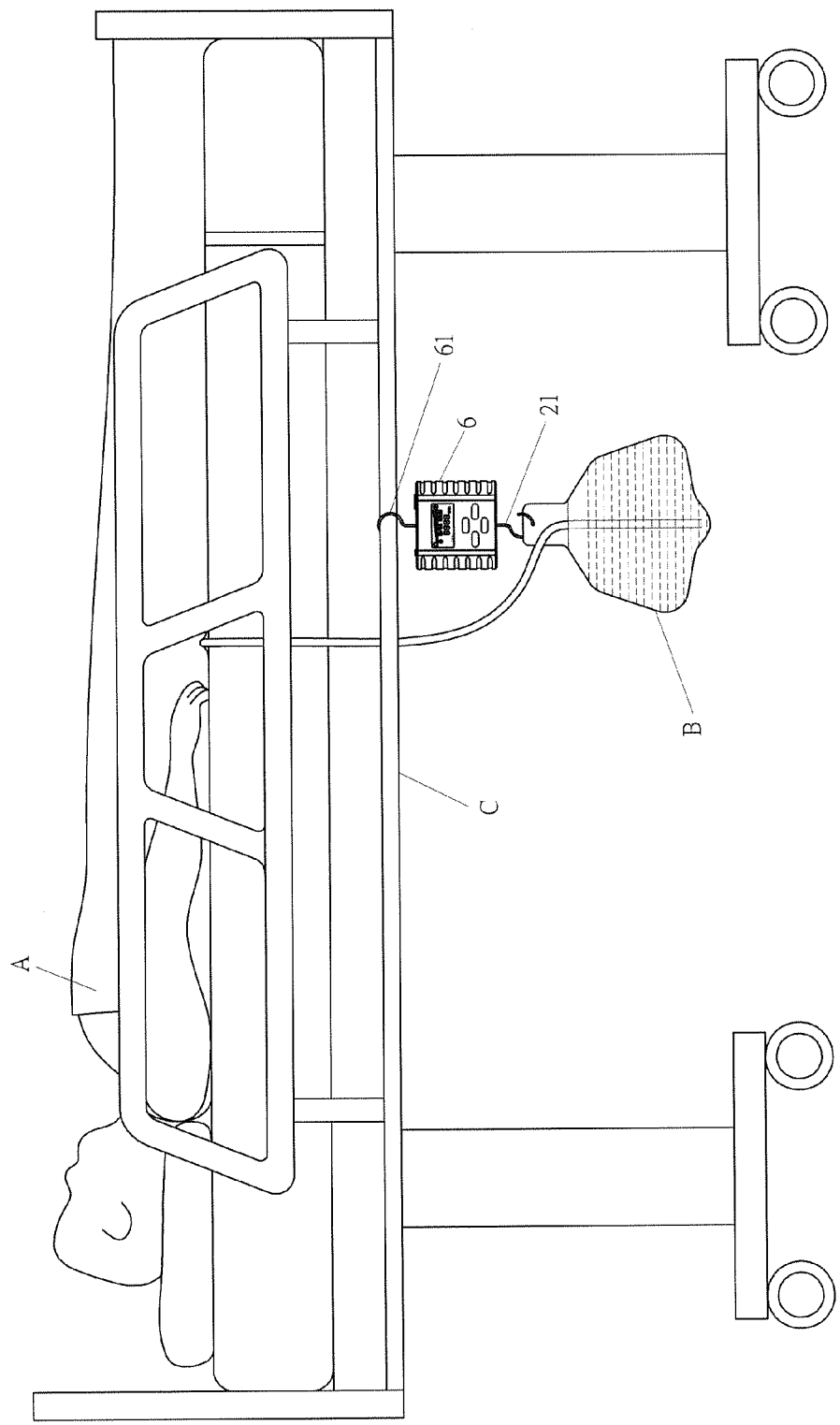
FIG. 3 is a plan view showing the application of the device for detecting abnormal state of medical container according to the preferred embodiment of the present invention.

Referring to FIG. 3, the device is applied to execute a method for detecting abnormal state of medical container. In one embodiment, a urine collection bag B which is coupled with a patient A is hanged on the first hook 21, and the housing 6 is hanged on a support frame C of a bed by the second hook 61.

Figure 5:
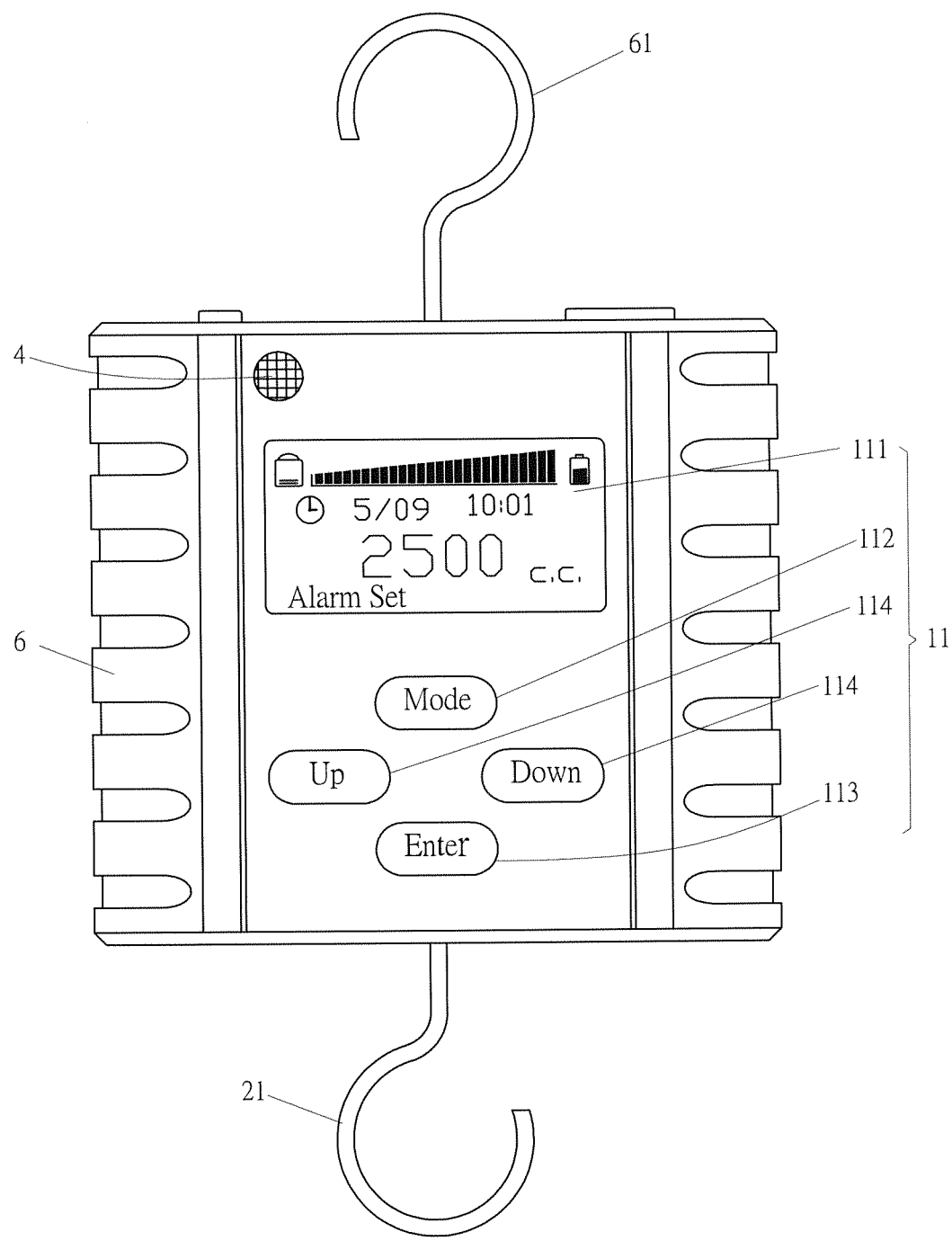
FIG. 5 is a plan view showing an operating module of a controlling unit of the device for detecting abnormal state of medical container according to the preferred embodiment of the present invention, wherein an estimated urine volume is inputted.
Figure 6:
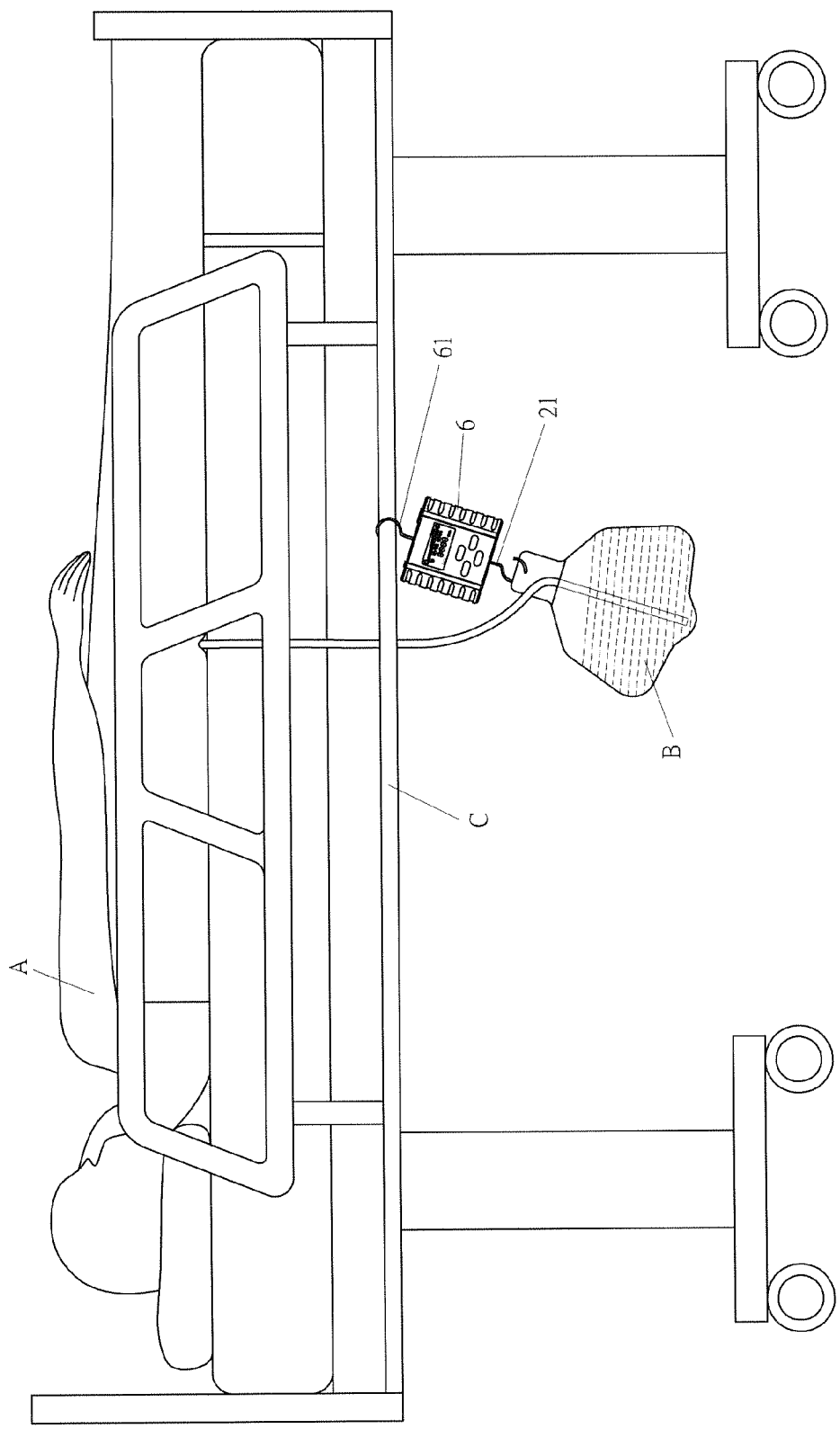
FIG. 6 is a plan view showing an application of the device for detecting abnormal state of medical container according to the preferred embodiment of the present invention, wherein a urine collection bag is pulled to incline due to turning of a patient.

To use, as shown in FIG. 4, a doctor selects a desired mode by operating the mode selection key 112 of the operating module 11, and the selected mode is then displayed by the display panel 111; likewise, the doctor further operates the adjusting key set 114 to input a value of estimated urine volume based on the patient's illness and medication status, hence the estimated urine volume is shown on the display panel 111 as an alarm set (as illustrated in FIG. 5, the alarm set is 2500 cc), thereafter the doctor operates the enter key 113 to store the estimated urine volume so that the device executes the following steps:

A. Enable the weight detecting unit 2 to detect weight of urine in the urine collection bag B and to acquire actual urine volume by dividing the detected urine weight by urine density; meanwhile, referring to FIG. 6, enable the inclination detecting unit 3 to detect whether the urine collection bag B is pulled to incline due to turning or trembling of the patient A on the bed and to arithmetically process the result to acquire inclination data. In this embodiment, because precise inclination data is not indispensable, the inclination detecting unit 3 is mounted on the housing 6 rather than the urine collection bag B so as to facilitate execution of inclination detecting process. In other words, inclination state of the urine collection bag B is represented by inclination state of the housing 6 in this embodiment. Nevertheless, if precise inclination data is required, a movable inclination detecting unit is mounted on the urine collection bag B such that the inclination data can be derived from inclination state of the urine collection bag B directly and precisely.

B. Receive the actual urine volume and the inclination data by the controlling unit 1.

C. Compare the actual urine volume and the inclination data with the estimated urine volume and initial inclination data, respectively, by the controlling unit 1, wherein if the actual urine volume exceeds the estimated urine volume, the warning unit 4 is started by the controlling unit 1 to remind medical personnel of replacement of a new urine collection bag or to remind medical personnel of urination status of the patient A; or if the inclination data is different from the initial inclination data, the controlling unit 1 starts the warning unit 4 to remind the medical personnel of confirming whether the patient turns body, trembles on the bed, or falls off the bed. The initial inclination data is derived from inclination state of the housing 6, or the urine collection bag B, when the housing 6 is just hanged on the support frame C of the bed together with the urine collection bag B hanged on the first hook 21 of the weight detecting unit 2. Preferably, during the break time or at midnight, a warning signal is transmitted to a monitoring platform 7 by the wireless transmission unit 5 so as to reduce inspection frequency of the medical personnel and to avoid disturbing the patient A.

Preferably, the operating module 11 of the controlling unit 1 is not only provided for inputting the estimated urine volume but also has recording or deleting function. For example, the operating module 11 can be served for setting recording time, such that the doctor is capable of observing the urination data of varying time or total urination data of the patient A. In addition, when the device is applied to next patient, the operating module 11 can be used to delete all of the data recorded therein. Since operating steps of the device for the next patient are the same as above-mentioned description, further remarks are omitted.

Figure 7:
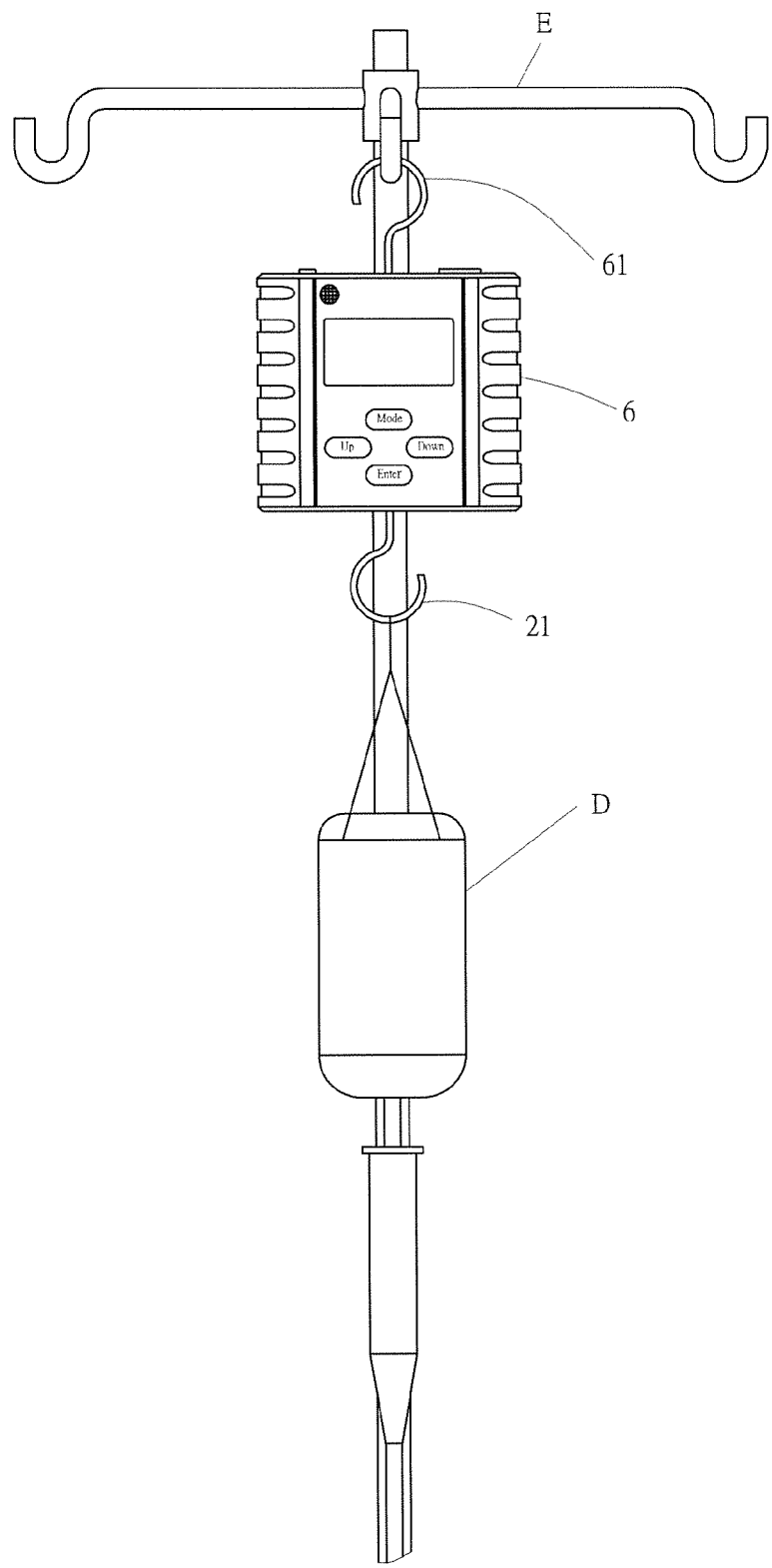
FIG. 7 is another plan view showing another application of the device for detecting abnormal state of medical container according to the preferred embodiment of the present invention, wherein a drip bottle is hanged on the device.

In another embodiment, as illustrated in FIG. 7, the medical container is a drip bottle D. The drip bottle D is coupled with the patient A and is hanged on the first hook 21, and the housing 6 is hanged on a drip stand E by the second hook 61 thereof.

After the doctor operates the operating module 11 to select a desired mode and to input expected flow speed of medicament according to different medicaments, the device enables the weight detecting unit 2 to detect weight change of the drip bottle D over time so as to calculate and acquire actual flow speed of the medicament in the drip bottle D. When the actual flow speed does not match with the expected flow speed, the controlling unit 1 starts the warning unit 4, or when actual inclination data detected and derived by the inclination detecting unit 3 is different from initial inclination data, the controlling unit 1 starts the warning unit 4 to remind the medical personnel of confirming whether the patient turns the body, trembles on the bed, or falls off the bed due to discomfort. The initial inclination data is derived from inclination state of the housing 6, or the drip bottle D, when the housing 6 is just hanged on the drip stand E together with the drip bottle D hanged on the first hook 21 of the weight detecting unit 2.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for detecting abnormal state of a medical container, the method comprising steps of:
    enabling a weight detecting unit to detect weight of the medical container which is coupled with a patient, to derive content change data from the detected weight of the medical container, and to store the content change data;
    enabling an inclination detecting unit to detect inclination state of the medical container, to derive inclination data from the detected inclination state, and to store the inclination data;
    receiving the content change data and the inclination data by a controlling unit; and
    comparing, by the controlling unit, the content change data and the inclination data with preset content data and initial inclination data, respectively, such that when the content change data is different from the preset content data, a warning unit is started by the controlling unit; or when the inclination data is different from the initial inclination data, the warning unit is started by the controlling unit.

2. The method as claimed in claim 1, wherein in the step of comparing, a warning signal is transmitted to a monitoring platform by a wireless transmission unit.

3. The method as claimed in claim 1, wherein the medical container is a drip bottle, the content change data is actual flow speed of medicament in the drip bottle, and the preset content data is expected flow speed of medicament in the drip bottle, and wherein in the step of comparing, the warning unit is started by the controlling unit when the actual flow speed does not match with the expected flow speed.

4. The method as claimed in claim 1, wherein the medical container is a urine collection bag, the content change data is actual urine volume in the urine collection bag, and the preset content data is estimated urine volume in the urine collection bag, and wherein in the step of comparing, the warning unit is started by the controlling unit when the actual urine volume exceeds the estimated urine volume.

5. A device for detecting abnormal state of a medical container, the device comprising:
    a controlling unit in which preset content data is stored;
    a weight detecting unit, coupled with the medical container and electrically connected with the controlling unit, for detecting a weight of the medical container so as to acquire content change data and to input the content change data into the controlling unit;
    an inclination detecting unit, electrically coupled with the controlling unit, for detecting inclination state of the medical container so as to acquire inclination data and to input the inclination data into the controlling unit; and
    a warning unit electrically coupled with the controlling unit;
    wherein the content change data and the inclination data are respectively compared with the preset content data and initial inclination data by the controlling unit, and when the content change data is different from the preset content data, the warning unit is started by the controlling unit; or when the inclination data is different from the initial inclination data, the warning unit is started by the controlling unit.

6. The device as claimed in claim 5, wherein the controlling unit, the weight detecting unit, the inclination detecting unit and the warning unit are integrated on a housing, and the weight detecting unit has a first hook extending out of the housing.

7. The device as claimed in claim 6, wherein the housing has a second hook disposed thereon opposite to the first hook.

8. The device as claimed in claim 5 further comprising a wireless transmission unit electrically connected with the controlling unit.

* * * * *